US012220790B2

(12) United States Patent
Nakahara et al.

(10) Patent No.: US 12,220,790 B2

(45) Date of Patent: Feb. 11, 2025

(54) IMPACT TOOL, METHOD FOR CONTROLLING THE IMPACT TOOL, AND PROGRAM

(71) Applicant: Panasonic Intellectual Property Management Co., Ltd., Osaka (JP)

(72) Inventors: Masayuki Nakahara, Osaka (JP); Takashi Kusagawa, Osaka (JP); Takahiro Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 17/774,014

(22) PCT Filed: Oct. 14, 2020

(86) PCT No.: PCT/JP2020/038841

§ 371 (c)(1),
(2) Date: May 3, 2022

(87) PCT Pub. No.: WO2021/100368

PCT Pub. Date: May 27, 2021

(65) Prior Publication Data

US 2022/0379445 A1 Dec. 1, 2022

(30) Foreign Application Priority Data

Nov. 22, 2019 (JP) ................................ 2019-211832

(51) Int. Cl.
*B25B 21/02* (2006.01)

(52) U.S. Cl.
CPC .................................... *B25B 21/02* (2013.01)

(58) Field of Classification Search
CPC .... B25D 11/064; B25D 11/06; B25D 17/245; B25D 17/24; B25B 21/02; B25B 21/023;
(Continued)

(56) References Cited

U.S. PATENT DOCUMENTS 6,687,567 B2 * 2/2004 Watanabe ........... B25B 23/1475 173/176
9,455,652 B2 * 9/2016 Ueno .................... H02P 29/027
(Continued)

FOREIGN PATENT DOCUMENTS

JP H10-328952 A 12/1998
JP 2010-207951 A 9/2010
(Continued)

OTHER PUBLICATIONS

International Search Report dated Dec. 28, 2020 issued in International Patent Application No. PCT/JP2020/038841, with English translation.

(Continued)

*Primary Examiner* — Dariush Seif
(74) *Attorney, Agent, or Firm* — Rimon P.C.

(57) ABSTRACT

An impact tool includes a motor, a control unit, an output shaft, a transmission mechanism, and an impact detection unit. The transmission mechanism includes an impact mechanism. The impact mechanism performs an impact operation according to magnitude of torque applied to the output shaft. The impact detection unit determines, based on at least one of an excitation current (current measured value) to be supplied to the motor or a torque current (current measured value) to be supplied to the motor, whether or not the impact operation is being performed. The control unit fulfills an impact response function by performing restriction processing in response to detection of the impact operation by the impact detection unit as a trigger. The restriction processing includes at least one of lowering the number of revolutions of the motor or stopping rotating the motor.

14 Claims, 7 Drawing Sheets

(58) Field of Classification Search
CPC ....... B25B 21/026; B25B 19/00; B25B 23/16; H01F 7/1615; H01F 2007/1692; H02K 33/12; H02K 35/00; H02K 35/02
USPC ................ 173/114, 117, 202, 212, 128, 1, 2
See application file for complete search history.

(56) References Cited

U.S. PATENT DOCUMENTS

| | | | | |
|---|---|---|---|---|
| 11,897,095 | B2* | 2/2024 | Carlson | B25B 21/026 |
| 2002/0060082 | A1* | 5/2002 | Watanabe | B25B 23/1405 173/176 |
| 2007/0013338 | A1* | 1/2007 | Swamy | H02P 3/18 318/798 |
| 2010/0252287 | A1* | 10/2010 | Morimura | B25B 21/02 173/9 |
| 2011/0079407 | A1* | 4/2011 | Iimura | B25B 23/1405 173/217 |
| 2011/0214894 | A1* | 9/2011 | Harada | B25B 21/02 173/2 |
| 2011/0315417 | A1* | 12/2011 | Matsunaga | B25B 21/008 173/176 |
| 2012/0199372 | A1* | 8/2012 | Nishikawa | B25B 21/02 173/132 |
| 2012/0222876 | A1* | 9/2012 | Schmidt | B25B 31/00 173/179 |
| 2012/0292065 | A1* | 11/2012 | Hoshi | B25B 21/02 173/93 |
| 2012/0318550 | A1* | 12/2012 | Tanimoto | B25B 23/1475 173/117 |
| 2013/0133911 | A1* | 5/2013 | Ishikawa | B25B 21/026 173/176 |
| 2013/0333910 | A1* | 12/2013 | Tanimoto | B25B 21/02 173/176 |
| 2014/0365012 | A1* | 12/2014 | Chen | B25B 21/02 81/464 |
| 2015/0083448 | A1* | 3/2015 | Chen | B25B 23/1475 81/464 |
| 2015/0096775 | A1* | 4/2015 | Chen | B25B 21/02 173/1 |
| 2015/0122521 | A1* | 5/2015 | Chen | B25B 21/02 173/1 |
| 2015/0122525 | A1* | 5/2015 | Wei | B25B 23/1405 173/179 |
| 2015/0135907 | A1* | 5/2015 | Hirabayashi | B23Q 5/048 81/54 |
| 2015/0144365 | A1* | 5/2015 | Hirabayashi | B25B 23/1405 173/2 |
| 2015/0231771 | A1* | 8/2015 | Sakai | B25B 21/02 173/176 |
| 2016/0107297 | A1* | 4/2016 | Ishikawa | B25B 23/18 173/179 |
| 2016/0121467 | A1* | 5/2016 | Ng | B25B 23/1475 81/464 |
| 2016/0129576 | A1* | 5/2016 | Nishikawa | B25D 16/006 173/2 |
| 2016/0354905 | A1* | 12/2016 | Ely | B25B 21/008 |
| 2017/0008156 | A1* | 1/2017 | Miyazaki | B25B 23/1475 |
| 2017/0057064 | A1* | 3/2017 | Ishikawa | B25B 23/1475 |
| 2017/0093315 | A1* | 3/2017 | Ichikawa | H02P 27/08 |
| 2017/0217001 | A1* | 8/2017 | Oishi | B25B 21/02 |
| 2017/0246732 | A1* | 8/2017 | Dey, IV | B25B 23/1475 |
| 2017/0373614 | A1* | 12/2017 | Lewis | B24B 23/028 |
| 2018/0200872 | A1* | 7/2018 | Leong | B25B 21/002 |
| 2018/0272511 | A1* | 9/2018 | Sako | B25B 23/1405 |
| 2018/0297179 | A1* | 10/2018 | Osada | B25B 21/008 |
| 2019/0022836 | A1* | 1/2019 | Chu | G01L 25/003 |
| 2019/0030692 | A1* | 1/2019 | Harada | B25B 23/1475 |
| 2019/0047131 | A1* | 2/2019 | Ichikawa | B25B 21/02 |
| 2019/0262977 | A1* | 8/2019 | Seith | H02P 6/21 |
| 2019/0321949 | A1* | 10/2019 | Miyazaki | G05B 19/182 |
| 2020/0130153 | A1* | 4/2020 | Yoneda | B25B 23/147 |
| 2021/0060755 | A1* | 3/2021 | Kawai | B25F 5/00 |
| 2021/0094163 | A1* | 4/2021 | Kato | B25F 5/00 |
| 2022/0014128 | A1* | 1/2022 | Dai | B25B 23/1475 |
| 2022/0140694 | A1* | 5/2022 | Yoneda | B25F 5/00 318/400.22 |
| 2022/0200511 | A1* | 6/2022 | Friedman | B25B 21/026 |
| 2022/0379445 | A1* | 12/2022 | Nakahara | B25B 23/1475 |
| 2023/0001548 | A1* | 1/2023 | Ueda | B25B 23/1475 |

FOREIGN PATENT DOCUMENTS

| | | | |
|---|---|---|---|
| JP | 2016-078230 | A | 5/2016 |
| JP | 2017-132021 | A | 8/2017 |
| JP | 2017-189067 | A | 10/2017 |
| JP | 2019-030948 | A | 2/2019 |
| WO | 2018/230141 | A1 | 12/2018 |

OTHER PUBLICATIONS

International Search Report dated Dec. 28, 2020 issued in International Patent Application No. PCT/JP2020/038840, with English translation.

* cited by examiner

IMPACT TOOL, METHOD FOR CONTROLLING THE IMPACT TOOL, AND PROGRAM

CROSS-REFERENCE OF RELATED APPLICATIONS

This application is the U.S. National Phase under 35 U.S.C. § 371 of International Patent Application No. PCT/JP2020/038841, filed on Oct. 14, 2020, which in turn claims the benefit of Japanese Patent Application No. 2019-211832, filed on Nov. 22, 2019, the entire disclosures of which Applications are incorporated by reference herein.

TECHNICAL FIELD

The present disclosure generally relates to an impact tool, a method for controlling the impact tool, and a program. More particularly, the present disclosure relates to an impact tool including a motor to be subjected to vector control, a method for controlling the impact tool, and a program for performing the control method.

BACKGROUND ART

Patent Literature 1 discloses an impact rotary tool (impact tool) including a motor, an impact mechanism, an output shaft, a control unit, trigger switch, and a motor driving unit. The impact mechanism includes a hammer and applies impacting force to the output shaft with the output of the motor, thus allowing the impact rotary tool to tighten a screw. The control unit gives a driving instruction according to a manipulative variable of the trigger switch to the motor driving unit. In accordance with the driving instruction given by the control unit, the motor driving unit regulates the voltage applied to the motor, thereby adjusting the number of revolutions of the motor.

When the impact rotary tool of Patent Literature 1 is used to tighten a fastening member such as a drill screw, the motor may continue to rotate even after the fastening member has been tightened, thus possibly tightening the fastening member too much.

CITATION LIST

Patent Literature

Patent Literature 1: JP 2017-132021 A

SUMMARY OF INVENTION

It is therefore an object of the present disclosure to provide an impact tool, a method for controlling the impact tool, and a program, all of which may reduce the chances of tightening the fastening member too much.

An impact tool according to an aspect of the present disclosure includes a motor, a control unit, an output shaft, a transmission mechanism, and an impact detection unit. The control unit performs vector control on the motor. The output shaft is to be coupled to a tip tool. The transmission mechanism transmits motive power of the motor to the output shaft. The transmission mechanism includes an impact mechanism. The impact mechanism performs an impact operation according to magnitude of torque applied to the output shaft. The impact mechanism applies impacting force to the output shaft while performing the impact operation. The impact detection unit determines, based on at least one of an excitation current to be supplied to the motor or a torque current to be supplied to the motor, whether or not the impact operation is being performed. The control unit has an impact response function. The control unit fulfills the impact response function by performing restriction processing in response to detection of the impact operation by the impact detection unit as a trigger. The restriction processing includes at least one of lowering the number of revolutions of the motor or stopping rotating the motor.

A method for controlling an impact tool according to another aspect of the present disclosure is a method for controlling an impact tool including a motor, a control unit, an output shaft, and a transmission mechanism. The control unit performs vector control on the motor. The output shaft is to be coupled to a tip tool. The transmission mechanism transmits motive power of the motor to the output shaft. The transmission mechanism includes an impact mechanism. The impact mechanism performs an impact operation according to magnitude of torque applied to the output shaft. The impact mechanism applies impacting force to the output shaft while performing the impact operation. The method for controlling the impact tool includes performing impact detection processing including determining, based on at least one of an excitation current to be supplied to the motor or a torque current to be supplied to the motor, whether or not the impact operation is being performed. The method for controlling the impact tool includes performing restriction processing in response to detection of the impact operation through the impact detection processing as a trigger. The restriction processing includes at least one of lowering the number of revolutions of the motor or stopping rotating the motor.

A program according to still another aspect of the present disclosure is designed to cause one or more processors to perform the method for controlling the impact tool described above.

DESCRIPTION OF EMBODIMENTS

Embodiments of an impact tool 1 will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are schematic representations. That is to say, the ratio of the dimensions (including thicknesses) of respective constituent elements illustrated on the drawings does not always reflect their actual dimensional ratio.

(1) Overview

Figure 1:
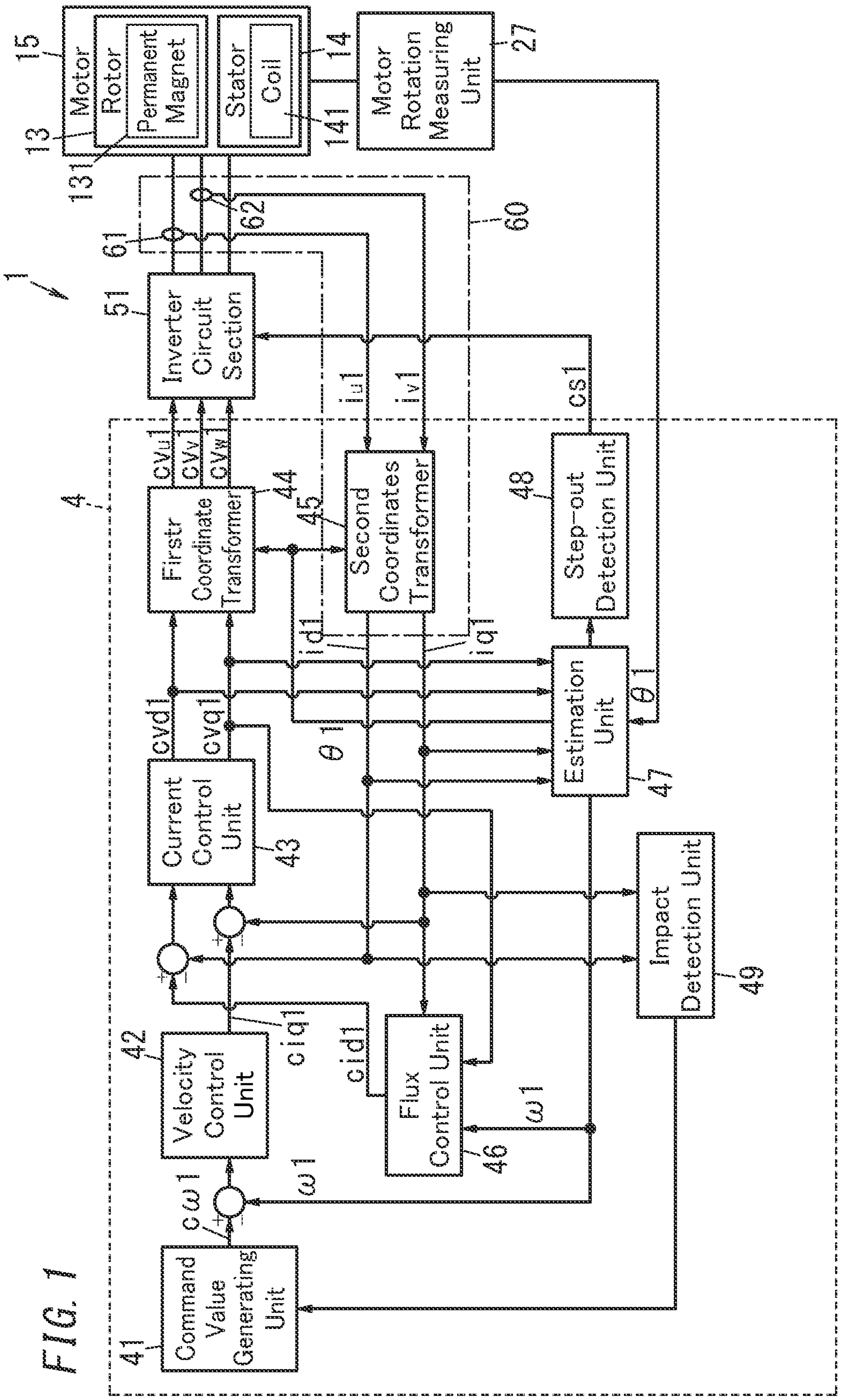
FIG. 1 is a block diagram of an impact tool according to an exemplary embodiment.
Figure 2:
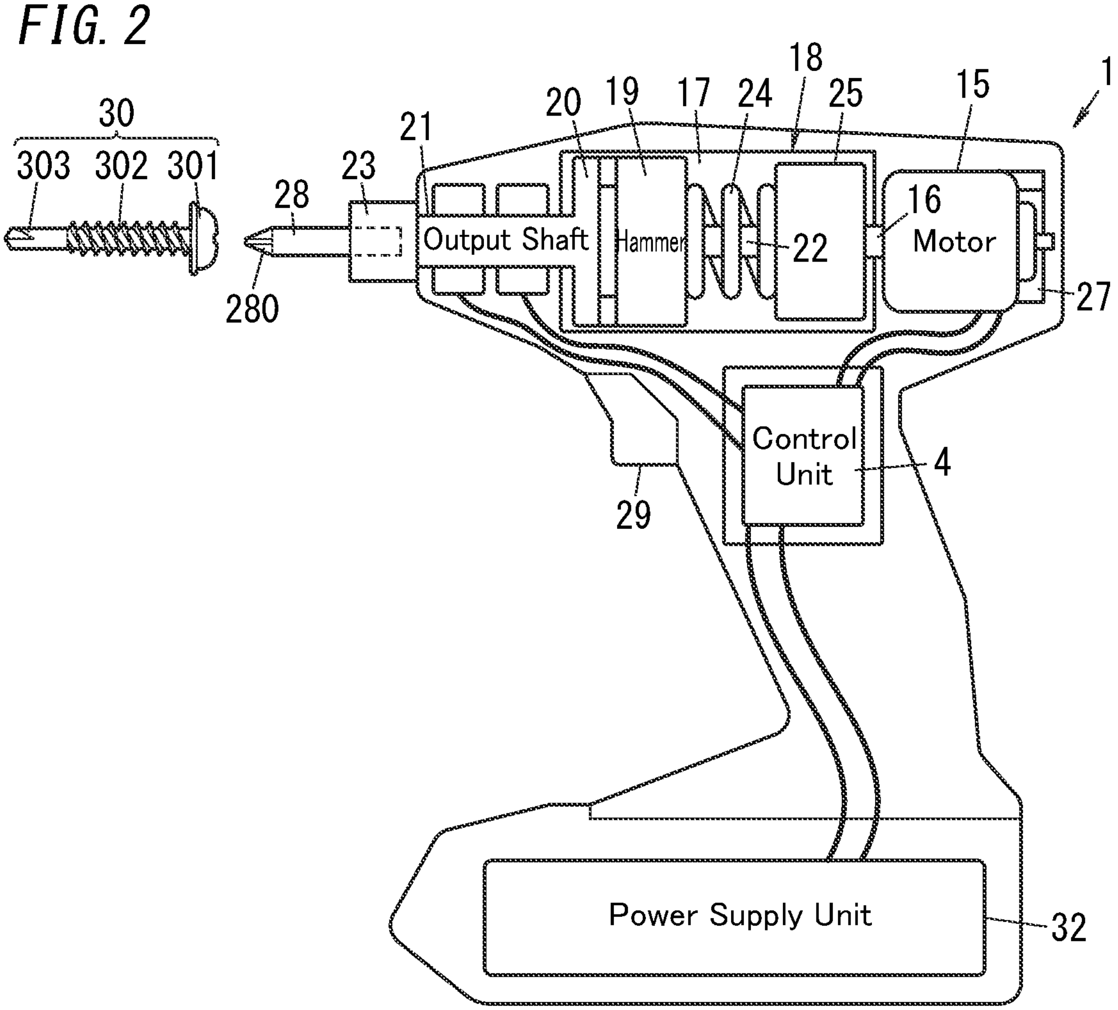
FIG. 2 is a schematic representation of the impact tool.

The impact tool 1 (see FIG. 2) may be used as, for example, an impact screwdriver, a hammer drill, an impact drill, an impact drill-screwdriver, or an impact wrench. In the following description of an exemplary embodiment, a situation where the impact tool 1 is used as an impact screwdriver for fastening a screw will be described as a typical application. As shown in FIGS. 1 and 2, the impact tool 1 includes a motor 15, a control unit 4, an output shaft 21, a transmission mechanism 18, and an impact detection unit 49. The control unit 4 performs vector control on the motor 15. The output shaft 21 is to be coupled to a tip tool 28. The transmission mechanism 18 transmits motive power of the motor 15 to the output shaft 21. The transmission mechanism 18 includes an impact mechanism 17. The impact mechanism 17 performs an impact operation according to the magnitude of torque applied to the output shaft 21. The impact mechanism 17 applies impacting force to the output shaft 21 while performing the impact operation. The impact detection unit 49 determines, based on at least one of an excitation current (current measured value id1) to be supplied to the motor 15 or a torque current (current measured value iq1) to be supplied to the motor 15, whether or not any impact operation is being performed. The control unit 4 has an impact response function. The control unit 4 fulfills the impact response function by performing restriction processing in response to detection of the impact operation by the impact detection unit 49 as a trigger. The restriction processing includes at least one of lowering the number N1 of revolutions of the motor 15 or stopping rotating the motor 15.

In the impact tool 1 according to this embodiment, in a situation where a fastening member 30 such as a drill screw is tightened with a tip tool 28, the control unit 4 either lowers the number N1 of revolutions of the motor 15 or stops rotating the motor 15 after the impact mechanism 17 has started to perform the impact operation. This may reduce the chances of tightening the fastening member 30 too much.

The motor 15 may be a brushless motor. In particular, the motor 15 according to this embodiment is a synchronous motor. More specifically, the motor 15 may be a permanent magnet synchronous motor (PMSM). The motor 15 includes a rotor 13 having a permanent magnet 131 and a stator 14 having a coil 141. The rotor 13 includes a rotary shaft 16 which outputs rotational power. The rotor 13 rotates with respect to the stator 14 due to electromagnetic interaction between the coil 141 and the permanent magnet 131.

The vector control is a type of motor control method in which a current supplied to the coil 141 of the motor 15 is broken down into a current component (excitation current) that generates a magnetic flux and a current component (torque current) that generates a torque (rotational power) and in which these current components are controlled independently of each other.

At least one of the current measured values id1, iq1 is used for both purposes of performing the vector control and determining whether or not any impact operation is being performed. This allows a part of a circuit for performing the vector control and a part of a circuit for determining whether or not any impact operation is being performed to be shared. This contributes to reducing the areas and dimensions of circuits provided for the impact tool 1 and cutting down the cost required for the circuits. In addition, this also improves the accuracy of detection compared to, for example, a situation where a measured value of the output current of the power supply unit 32 of the impact tool 1 is used to determine whether or not any impact operation is being performed.

(2) Impact Tool

As shown in FIG. 2, the impact tool 1 includes a power supply unit 32, the motor 15, a motor rotation measuring unit 27, the transmission mechanism 18, the output shaft 21, a socket 23, and the tip tool 28. In addition, the impact tool 1 further includes a trigger switch 29 and the control unit 4. The control unit 4 includes the impact detection unit 49 for determining whether or not the impact mechanism 17 is performing any impact operation.

The output shaft 21 is a part that rotates upon receiving the driving force transmitted from the motor 15 via the transmission mechanism 18. The socket 23 is fixed to the output shaft 21. The tip tool 28 is attached removably to the socket 23. The tip tool 28 rotates along with the output shaft 21. The impact tool 1 is designed to rotate the tip tool 28 by turning the output shaft 21 with the driving force applied by the motor 15. That is to say, the impact tool 1 is a tool for driving the tip tool 28 with the driving force applied by the motor 15. The tip tool 28 (also called a "bit") may be a screwdriver bit or a drill bit, for example. One of various types of tip tools 28 is selected depending on the intended use and attached to the socket 23 for the intended use. Alternatively, the tip tool 28 may be directly attached to the output shaft 21.

The impact tool 1 according to this embodiment includes the socket 23, thus making the tip tool 28 replaceable depending on the intended use. However, the tip tool 28 does not have to be replaceable. Alternatively, the impact tool 1 may also be an impact tool designed to allow the use of only a particular type of tip tool 28, for example.

The tip tool 28 according to this embodiment is a screwdriver bit for tightening or loosening a fastening member 30 (screw). More specifically, the tip tool 28 is a plus screwdriver bit, of which a tip portion 280 is formed in a + (plus) shape. That is to say, the output shaft 21 holds the screwdriver bit for tightening or loosening a screw and rotates upon receiving motive power from the motor 15. In the following description, a situation where the screw is tightened by the impact tool 1 will be described as an example. Note that any type of screw may be used without limitation. The screw may be a bolt, a screw, or a nut, for example. If the operation mode of the control unit 4 is the first mode (to be described later), a drill screw is particularly suitably used as the fastening member 30. In the first mode, the control unit 4 enables an impact response function. As shown in FIG. 2, the fastening member 30 according to this embodiment is a drill screw. The fastening member 30 includes a head portion 301, a tap 302, and a drill 303. The head portion 301 is connected to a first end of the tap 302 in the shape of a shaft. The drill 303 is connected to a second end of the tap 302. The head portion 301 has a screw hole (such as a plus (+) hole) that fits the tip tool 28. The tap 302 has a thread thereon. The drill 303 includes a blade.

The tip tool 28 fits the fastening member 30. That is to say, the tip tool 28 is inserted into the screw hole on the head portion 301 of the fastening member 30. In this state, the tip tool 28 is caused to rotate by being driven by the motor 15, thereby turning the fastening member 30. In this manner, the fastening member 30 (drill screw) has the drill 303 make a hole in the target member of screwing (such as a wall member) and also has the tap 302 cut a thread groove on the inner surface of the hole. Furthermore, the tap 302 is tightened into the thread groove. That is to say, the tip tool 28 applies tightening (or loosening) force to the fastening member 30.

The power supply unit 32 supplies a current for driving the motor 15. The power supply unit 32 may be a battery pack, for example. The power supply unit 32 may include, for example, either a single secondary battery or a plurality of secondary batteries.

The transmission mechanism 18 includes a planetary gear mechanism 25, a drive shaft 22, and the impact mechanism 17. The transmission mechanism 18 transmits the rotational power of the rotary shaft 16 of the motor 15 to the output shaft 21. More specifically, the transmission mechanism 18 regulates the rotational power of the rotary shaft 16 of the motor 15 and outputs the rotational power thus regulated as the rotational power of the output shaft 21.

The rotary shaft 16 of the motor 15 is connected to the planetary gear mechanism 25. The drive shaft 22 is connected to the planetary gear mechanism 25 and the impact mechanism 17. The planetary gear mechanism 25 reduces the rotational power of the rotary shaft 16 of the motor 15 at a predetermined reduction ratio and outputs the rotational power thus reduced as the rotational power of the drive shaft 22.

The impact mechanism 17 is coupled to the output shaft 21. The impact mechanism 17 transmits the rotational power (of the rotary shaft 16) of the motor 15, which has been received via the planetary gear mechanism 25 and the drive shaft 22, to the output shaft 21. In addition, the impact mechanism 17 also performs an impact operation of applying impacting force to the output shaft 21.

The impact mechanism 17 includes a hammer 19, an anvil 20, and a spring 24. The hammer 19 is attached to the drive shaft 22 via a cam mechanism. The anvil 20 is in contact with, and rotates along with, the hammer 19. The spring 24 biases the hammer 19 toward the anvil 20. The anvil 20 is formed integrally with the output shaft 21. Alternatively, the anvil 20 may also be formed separately from, and be fixed to, the output shaft 21.

Unless a load (torque) with a predetermined magnitude or more is applied to the output shaft 21, the impact mechanism 17 causes the output shaft 21 to turn continuously with the rotational power of the motor 15. That is to say, in that case, the drive shaft 22 and the hammer 19 that are coupled to each other via the cam mechanism rotate along with each other and the hammer 19 and the anvil 20 also rotate with each other. Thus, the output shaft 21 formed integrally with the anvil 20 rotates.

On the other hand, upon the application of a load with the predetermined magnitude or more to the output shaft 21, the impact mechanism 17 performs an impact operation. In performing the impact operation, the impact mechanism 17 generates impacting force by transforming the rotational power of the motor 15 into pulses of torque. That is to say, while the impact operation is being performed, the hammer 19 retreats by overcoming the biasing force applied by the spring 24 (i.e., goes away from the anvil 20) while being regulated by the cam mechanism between the drive shaft 22 and the hammer 19 itself. At a point in time when the hammer 19 retreats to be decoupled from the anvil 20, the hammer 19 starts advancing (i.e., toward the output shaft 21) while rotating, thereby applying impacting force to the anvil 20 in the rotational direction and causing the output shaft 21 to rotate. That is to say, the impact mechanism 17 applies rotational impact around the axis (output shaft 21) to the output shaft 21 via the anvil 20. While the impact mechanism 17 is performing the impact operation, the hammer 19 repeatedly performs the operation of applying impacting force to the anvil 20 in the rotational direction. Every time the hammer 19 advances and retreats, the impacting force is generated once.

The trigger switch 29 is an operating member for accepting the operation of controlling the rotation of the motor 15. The motor 15 may be selectively activated (turned ON or OFF) by the operation of pulling the trigger switch 29. In addition, the rotational velocity of the motor 15 is adjustable depending on the manipulative variable of the operation of pulling the trigger switch 29 (i.e., depending on how deep the trigger switch 29 is pulled). As a result, the rotational velocity of the output shaft 21 is adjustable depending on the manipulative variable of the operation of pulling the trigger switch 29. The greater the manipulative variable is, the higher the rotational velocity of the motor 15 and the output shaft 21 becomes. The control unit 4 either starts or stops rotating the motor 15 and the output shaft 21, and controls the rotational velocity of the motor 15 and the output shaft 21, depending on the manipulative variable of the operation of pulling the trigger switch 29. In this impact tool 1, the tip tool 28 is coupled to the output shaft 21 via the socket 23. In addition, the rotational velocity of the motor 15 and the output shaft 21 is controlled by operating the trigger switch 29, thereby controlling the rotational velocity of the tip tool 28.

The motor rotation measuring unit 27 measures the rotational angle of the motor 15. As the motor rotation measuring unit 27, a photoelectric encoder or a magnetic encoder may be adopted, for example.

The impact tool 1 includes an inverter circuit section 51 (see FIG. 1). The inverter circuit section 51 supplies an electric current to the motor 15. The control unit 4 is used along with the inverter circuit section 51 to control the operation of the motor 15 by feedback control.

(3) Control Unit

The control unit 4 includes a computer system including one or more processors and a memory. At least some of the functions of the control unit 4 are performed by making the processor(s) of the computer system execute a program stored in the memory of the computer system. The program may be stored in the memory. The program may also be downloaded via a telecommunications line such as the Internet or distributed after having been stored in a non-transitory storage medium such as a memory card.

As shown in FIG. 1, the control unit 4 includes a command value generating unit 41, a velocity control unit 42, a current control unit 43, a first coordinate transformer 44, a second coordinate transformer 45, a flux control unit 46, an estimation unit 47, a step-out detection unit 48, and the impact detection unit 49. The impact tool 1 further includes a plurality of (e.g., two in the example illustrated in FIG. 1) current sensors 61, 62.

Each of the plurality of current sensors 61, 62 includes, for example, a hall element current sensor or a shunt resistor element. The plurality of current sensors 61, 62 measure an electric current supplied from the power supply unit 32 (see FIG. 2) to the motor 15 via the inverter circuit section 51. In this embodiment, three-phase currents (namely, a U-phase current, a V-phase current, and a W-phase current) are supplied to the motor 15. The plurality of current sensors 61, 62 measure currents in at least two phases. In FIG. 1, the current sensor 61 measures the U-phase current to output a current measured value $i_u1$ and the current sensor 62 measures the V-phase current to output a current measured value $i_v1$.

The estimation unit 47 obtains a time derivative of the rotational angle θ1, measured by the motor rotation measuring unit 27, of the motor 15 to calculate an angular velocity col of the motor 15 (i.e., the angular velocity of the rotary shaft 16 thereof).

An acquisition unit 60 is made up of the two current sensors 61, 62 and the second coordinate transformer 45. The acquisition unit 60 acquires a d-axis current (excitation current) and a q-axis current (torque current), both of which are to be supplied to the motor 15. That is to say, the current measured value id1 of the d-axis current and the current measured value iq1 of the q-axis current are calculated by having two-phase currents measured by the two current sensors 61, 62 transformed by the second coordinate transformer 45.

The second coordinate transformer 45 performs, based on the rotational angle θ1, measured by the motor rotation measuring unit 27, of the motor 15, coordinate transformation on the current measured values $i_u$1, $i_v$1 measured by the plurality of current sensors 61, 62, thereby calculating current measured values id1, iq1. That is to say, the second coordinate transformer 45 transforms the current measured values $i_u$1, $i_v$1, corresponding to currents in two out of three phases, into a current measured value id1 corresponding to a magnetic field component (d-axis current) and a current measured value iq1 corresponding to a torque component (q-axis current).

The command value generating unit 41 generates a command value cω1 for the angular velocity of the motor 15. The command value generating unit 41 may generate, for example, a command value cω1 representing a manipulative variable that indicates how deep the trigger switch 29 (see FIG. 2) has been pulled. That is to say, as the manipulative variable increases, the command value generating unit 41 increases the command value cω1 of the angular velocity accordingly.

The velocity control unit 42 generates a command value ciq1 based on the difference between the command value cω1 generated by the command value generating unit 41 and the angular velocity ω1 calculated by the estimation unit 47. The command value ciq1 is a command value specifying the magnitude of a torque current (q-axis current) of the motor 15. The velocity control unit 42 determines the command value ciq1 to reduce the difference between the command value cω1 and the angular velocity ω1. More specifically, the velocity control unit 42 determines the command value ciq1 such that the difference becomes equal to or less than a predetermined first threshold value.

The flux control unit 46 generates a command value cid1 based on the angular velocity ω1 calculated by the estimation unit 47, a command value cvq1 (to be described later) generated by the current control unit 43, and the current measured value iq1. The command value cid1 is a command value that specifies the magnitude of the excitation current (d-axis current) of the motor 15. That is to say, the control unit 4 controls the operation of the motor 15 to bring the excitation current (d-axis current) to be supplied to the coil 141 of the motor 15 closer toward the command value cid1.

In this embodiment, the command value cid1 generated by the flux control unit 46 may be, for example, a command value to set the magnitude of the excitation current at zero. The flux control unit 46 may generate the command value cid1 to set the magnitude of the excitation current at zero constantly or may generate a command value cid1 to set the magnitude of the excitation current at a value greater or smaller than zero only as needed. When the command value cid1 of the excitation current becomes smaller than zero, a negative excitation current (i.e., a flux-weakening current) flows through the motor 15.

The current control unit 43 generates a command value cvd1 based on the difference between the command value cid1 generated by the flux control unit 46 and the current measured value id1 calculated by the second coordinate transformer 45. The command value cvd1 is a command value that specifies the magnitude of d-axis voltage of the motor 15. The current control unit 43 determines the command value cvd1 to reduce the difference between the command value cid1 and the current measured value id1. More specifically, the current control unit 43 determines the command value cvd1 such that the difference becomes equal to or less than a predetermined second threshold value.

In addition, the current control unit 43 also generates a command value cvq1 based on the difference between the command value ciq1 generated by the velocity control unit 42 and the current measured value iq1 calculated by the second coordinate transformer 45. The command value cvq1 is a command value that specifies the magnitude of q-axis voltage of the motor 15. The current control unit 43 generates the command value cvq1 to reduce the difference between the command value ciq1 and the current measured value iq1. More specifically, the current control unit 43 determines the command value cvq1 such that the difference becomes equal to or less than a predetermined third threshold value.

The first coordinate transformer 44 performs coordinate transformation on the command values cvd1, cvq1 based on the rotational angle θ1, measured by the motor rotation measuring unit 27, of the motor 15 to calculate command values $cv_u$1, $cv_v$1, $cv_w$1. Specifically, the first coordinate transformer 44 transforms the command value cvd1 for a magnetic field component (d-axis voltage) and the command value cvq1 for a torque component (q-axis voltage) into command values $cv_u$1, $cv_v$1, $cv_w$1 corresponding to voltages in three phases. Specifically, the command value $cv_u$1 corresponds to a U-phase voltage, the command value $cv_v$1 corresponds to a V-phase voltage, and the command value $cv_w$1 corresponds to a W-phase voltage.

The control unit 4 controls the power to be supplied to the motor 15 by performing pulse width modulation (PWM) control on the inverter circuit section 51. Thus, the inverter circuit section 51 supplies voltages in three phases, corresponding to the command values $cv_u$1, $cv_v$1, $cv_w$1, respectively, to the motor 15.

The motor 15 is driven with the power (voltages in three phases) supplied from the inverter circuit section 51, thus generating rotational power.

As a result, the control unit 4 controls the excitation current such that the excitation current flowing through the coil 141 of the motor 15 comes to have a magnitude corresponding to the command value cid1 generated by the flux control unit 46. In addition, the control unit 4 also controls the angular velocity of the motor 15 such that the angular velocity of the motor 15 becomes an angular velocity corresponding to the command value cω1 generated by the command value generating unit 41.

The step-out detection unit 48 detects a step-out (loss of synchronism) of the motor 15 based on the current measured values id1, iq1 acquired from the second coordinate transformer 45 and the command values cvd1, cvq1 acquired from the current control unit 43. On detecting the step-out, the step-out detection unit 48 transmits a stop signal cs1 to the inverter circuit section 51, thus having the supply of power from the inverter circuit section 51 to the motor 15 stopped.

The impact detection unit 49 determines whether or not the impact mechanism 17 is performing any impact operation. The impact detection unit 49 will be described in detail later.

(4) Details of Vector Control

Figure 3:
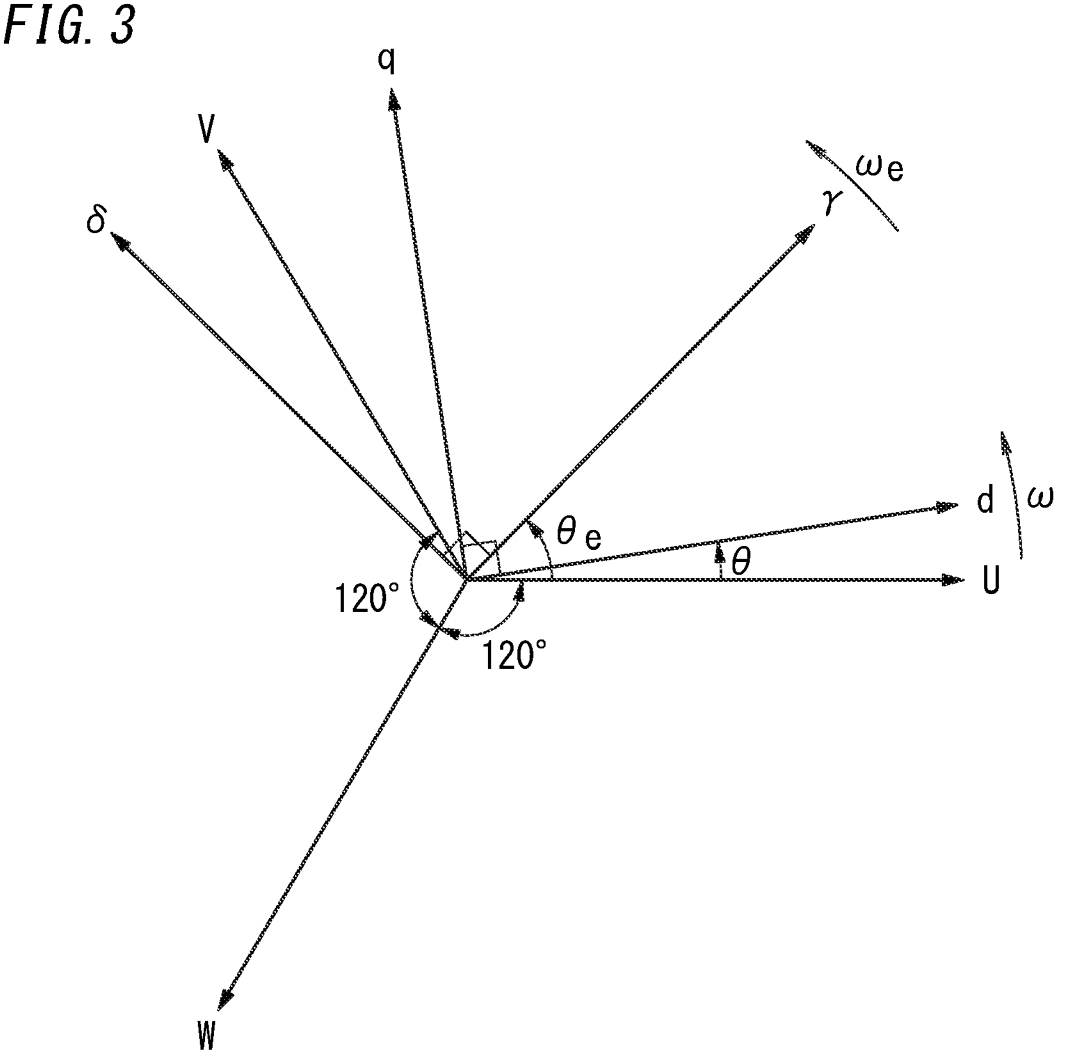
FIG. 3 illustrates how a control unit of the impact tool performs vector control.

Next, the vector control performed by the control unit 4 will be described in further detail. FIG. 3 shows an analysis model of the vector control. In FIG. 3, shown are armature winding fixed axes for the U-, V-, and W-phases. According to the vector control, a rotational coordinate system rotating at the same rotational velocity as a magnetic flux generated by the permanent magnet 131 provided for the rotor 13 of the motor 15 is taken into account. In the rotational coordinate system, the direction of the magnetic flux generated actually by the permanent magnet 131 is defined by a d-axis and a coordinate axis corresponding to the control of the motor 15 by the control unit 4 and corresponding to the d-axis is defined by a γ-axis. A q-axis is set at a phase leading by an electrical angle of 90 degrees with respect to the d-axis. A δ-axis is set at a phase leading by an electrical angle of 90 degrees with respect to the γ-axis.

The dq axes have rotated and their rotational velocity is designated by ω. The γδ axes have also rotated and their rotational velocity is designated by $\omega_e$. Note that ω, in FIG. 3 corresponds with ω1 shown in FIG. 1. Also, in the dq axes, the d-axis angle (phase) as viewed from the U-phase armature winding fixed axis is designated by θ. In the same way, in the γδ axes, the γ-axis angle (phase) as viewed from the U-phase armature winding fixed axis is designated by $\theta_e$. Note that $\theta_e$ in FIG. 3 corresponds with θ1 shown in FIG. 1. The angles designated by θ and $\theta_e$ are angles as electrical angles and are generally called "rotor positions" or "magnetic pole positions." The rotational velocities designated by ω and $\omega_e$ are angular velocities represented by electrical angles.

If θ and $\theta_e$ agree with each other, the d-axis and the q-axis agree with the γ-axis and the δ-axis, respectively. Basically, the control unit 4 performs the vector control such that θ and $\theta_e$ agree with each other. Thus, in a situation where the command value cid1 of the d-axis current is zero, as the load applied to the motor 15 increases or decreases, the control unit 4 performs control to compensate for the difference thus caused between θ and $\theta_e$, and therefore, the current measured value id1 of the d-axis current comes to have a positive or negative value. Specifically, right after the load applied to the motor 15 has decreased, the current measured value id1 of the d-axis current comes to have a positive value. The instant the load applied to the motor 15 increases, the current measured value id1 comes to have a negative value.

(5) Impact Detection

Figure 4:
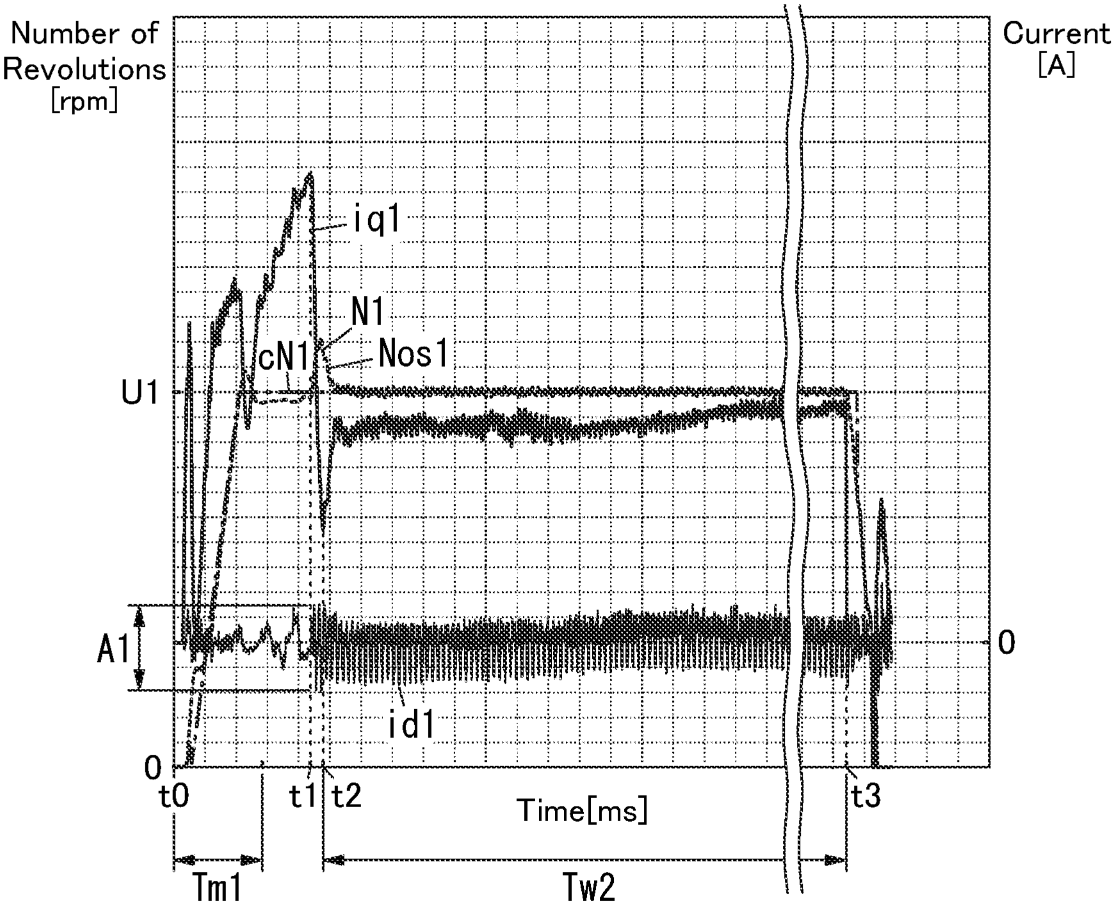
FIG. 4 is a graph showing an exemplary operation of the impact tool.

The impact mechanism 17 performs an impact operation according to the magnitude of torque applied to the output shaft 21. The impact detection unit 49 determines, based on at least one of a torque current to be supplied to the coil 141 of the motor 15 or an excitation current to be supplied to the coil 141 of the motor 15, whether or not the impact mechanism 17 is performing the impact operation. Next, it will be described with reference to FIG. 4 how the impact detection unit 49 may determine whether or not the impact operation is being performed. In FIG. 4, N1 indicates the number of revolutions of the (rotor 13 of the) motor 15 and cN1 indicates the command value of the number of revolutions of the motor 15. That is to say, the command value cN1 is a value obtained by converting an angular velocity command value cω1 of the motor 15 into the number of revolutions.

In this embodiment, the control unit 4 has, as mutually switchable operation modes, a first mode and a second mode. In the first mode, the control unit 4 enables the impact response function. Specifically, in the first mode, the control unit 4 performs restriction processing in response to the detection of the impact operation by the impact detection unit 49 as a trigger. The restriction processing includes at least one of lowering the number N1 of revolutions of the motor 15 or stopping rotating the motor 15. In the second mode, the control unit 4 disables the impact response function.

Therefore, the impact detection unit 49 may determine, at least when the operation mode of the control unit 4 is the first mode, whether or not the impact mechanism 17 is performing any impact operation. In the following description of an exemplary embodiment, the impact detection unit 49 is supposed to determine, irrespective of the operation mode of the control unit 4, whether or not the impact mechanism 17 is performing the impact operation. FIG. 4 is a graph showing the results obtained when the operation mode of the control unit 4 is the first mode.

Note that the impact tool 1 includes a first user interface for accepting the user's operating command, for example. The first user interface may be, for example, a button, a slide switch, or a touchscreen panel. In accordance with the user's operating command entered through the first user interface, the control unit 4 switches the operation mode from the first mode to the second mode, and vice versa. For example, the user sets the operation mode of the control unit 4 at the first mode if the fastening member 30 is a drill screw and sets the operation mode of the control unit 4 at the second mode otherwise.

Optionally, the first user interface may display some marker representing a drill screw at a location where switch to the first mode is supposed to be made. Examples of such markers include a character string such as "drill screw" or "drill screw mode" or an icon, picture, or photograph representing a drill screw. Such a marker may be provided on a mechanical button or a button displayed on the screen of the touchscreen panel for use to switch the operation mode to the first mode. Alternatively, the marker may also be provided beside the button. Still alternatively, the marker may also be provided beside the location of a slide switch when the operation mode is the first mode.

In addition, the control unit 4 further has the function of automatically switching the operation mode from the first mode to the second mode, and vice versa, in the following manner. Specifically, the control unit 4 switches, while the motor 15 is rotating in such a direction as to make the tip tool 28 tighten the fastening member 30, the operation mode to the first mode, and also switches, while the motor 15 is rotating in such a direction as to make the tip tool 28 loosen the fastening member 30, the operation mode to the second mode. That is to say, the control unit 4 switches the operation mode to the first mode when finding the motor 15 rotating in one of the forward and reverse directions and switches the operation mode to the second mode when finding the motor 15 rotating in the other direction. This configuration may reduce, in a situation where the fastening member 30 is loosened with the tip tool 28, the chances of the motor 15 having its number N1 of revolutions lowered unintentionally or having its rotation stopped unintentionally.

The impact detection unit 49 determines, based on at least one of a current measured value id1 of an excitation current or a current measured value iq1 of a torque current, whether or not any impact operation is being performed. In this embodiment, the impact detection unit 49 determines, based on both the current measured values id1, iq1, whether or not the impact operation is being performed.

More specifically, as for the current measured value id1, the impact detection unit 49 determines whether or not the following first condition is satisfied. The first condition is that the amplitude of the current measured value id1 be greater than a predetermined d-axis threshold value. The amplitude of the current measured value id1 is herein defined to be a half of the difference between the maximum and minimum values per unit time of the current measured value id1, for example. The impact detection unit 49 may determine, every time a predetermined unit time passes, for example, whether or not the first condition is satisfied. The amplitude A1 shown in FIG. 4 is double the amplitude of the current measured value id1 which is defined by the current measured values id1 at respective points in time until the unit time (of a few milliseconds to several ten milliseconds, for example) passes since a certain point in time t1.

In this manner, the impact detection unit 49 determines, based on the amplitude of the current measured value id1 (of excitation current), whether or not the impact operation is being performed.

On the other hand, as for the current measured value iq1, the impact detection unit 49 determines whether or not the following second condition is satisfied. The second condition is that the magnitude of decrease per unit time (of several ten milliseconds, for example) in the current measured value iq1 be greater than a predetermined q-axis threshold value. The impact detection unit 49 may determine, every time the predetermined time passes, for example, whether or not the second condition is satisfied.

In this manner, the impact detection unit 49 determines, based on the magnitude of decrease per predetermined time in the current measured value iq1 (of a torque current), whether or not the impact operation is being performed.

When finding the interval between a point in time when one of the first and second conditions is satisfied and a point in time when the other condition is satisfied equal to or less than a predetermined time threshold value, for example, the impact detection unit 49 outputs a result of detection indicating that the impact mechanism 17 is performing the impact operation. Otherwise, the impact detection unit 49 outputs a result of detection indicating that the impact mechanism 17 is not performing the impact operation.

That is to say, the load applied to the motor 15 increases and decreases incessantly. Once the impact operation has started to be performed, the magnitude of the increase or decrease in the load applied to the motor 15 rises, thus widening the difference between $\theta$ and $\theta_e$ and causing an increase in the amplitude of the current measured value id1 of the excitation current. In addition, once the impact operation has started to be performed, the load applied to the motor 15 falls while repeatedly increasing and decreasing, thus causing a decrease in the current measured value iq1 of the torque current. The impact detection unit 49 determines, by seeing based on the first and second conditions if any such change has occurred, whether or not the impact operation is being performed.

Threshold values such as the d-axis threshold value and the q-axis threshold value may be stored in advance in, for example, a memory of a microcontroller serving as the control unit 4.

Note that it is not until a predetermined mask period Tm1 has passed since the motor 15 started (started running) that the impact detection unit 49 starts determining whether or not the impact mechanism 17 is performing any impact operation. This may reduce the chances of the impact detection unit 49 detecting the impact operation erroneously during the mask period Tm1.

In FIG. 4, after the motor 15 has started running at a point in time t0, the impact mechanism 17 starts performing the impact operation at a point in time t1. Once the impact operation has started to be performed, the amplitude of the current measured value id1 increases from the point in time t1 on. Meanwhile, the current measured value iq1 decreases from the point in time t1 through a point in time t2. In at least a part of the interval between the points in time t1 and t2, the impact detection unit 49 may detect, based on the first and second conditions, the impact operation.

(6) Impact Response Function

If the operation mode of the control unit 4 is the second mode, the control of the motor 15 by the control unit 4 is not affected by whether or not the impact operation is detected by the impact detection unit 49. Thus, if the manipulative variable of the trigger switch 29 is constant, the command value cN1 of the number N1 of revolutions of the motor 15 does not change before and after the impact operation is detected.

On the other hand, if the operation mode of the control unit 4 is the first mode (i.e., if the impact response function is enabled), the control unit 4 lowers the number N1 of revolutions of the motor 15 in response to the detection of the impact operation by the impact detection unit 49 as a trigger. More specifically, the control unit 4 fulfills the impact response function by performing restriction processing when a predetermined decision condition is satisfied after the impact detection unit 49 has detected the impact operation. The restriction processing includes at least one of lowering the number N1 of revolutions of the motor 15 or stopping rotating the motor 15. In this embodiment, the decision condition is that a predetermined standby time Tw2 pass. This is an exemplary condition about the time that has passed since the impact detection unit 49 detected the impact operation. In this embodiment, after the standby time Tw2 has passed, the control unit 4 stops rotating the motor 15.

For example, if the impact detection unit 49 detects the impact operation at a point in time t2, then the control unit 4 stops rotating the motor 15 at a point in time t3 when the standby time Tw2 passes since the point in time t2. That is to say, at the point in time t3, the control unit 4 sets the command value cN1 of the number N1 of revolutions of the motor 15 at 0 rpm by decreasing the command value cN1 with the passage of time. Accordingly, the number N1 of revolutions also decreases with the passage of time and goes 0 rpm. More specifically, from the point in time t3 on, the control unit 4 decreases the command value cN1 with the passage of time, irrespective of the manipulative variable of the trigger switch 29, and eventually sets the command value cN1 to 0 rpm. Even more specifically, the command value generating unit 41 of the control unit 4 decreases the angular velocity command value cω1, thereby substantially decreasing the command value cN1 of the number N1 of revolutions.

Figure 5A:
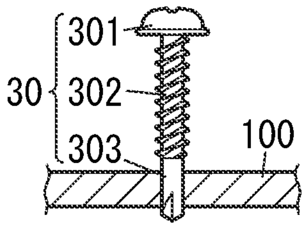
FIGS. 5A-5C illustrate how to perform screwing work using the impact tool.

The process step of tightening and screwing a drill screw as a fastening member 30 into a target member of screwing (e.g., the wall member 100 (see FIG. 5A)) by using the impact tool 1 may be performed, for example, in the following manner. First, the user puts the drill 303 (see FIG. 2) at the tip of the fastening member 30 onto the wall member 100. At a point in time t0, the user pulls the trigger switch 29 to start turning the tip tool 28. As a result, the drill 303 opens a hole through the wall member 100 as the fastening member 30 advances in such a direction as to penetrate through the wall member 100 (see FIG. 5A).

Figure 5B:
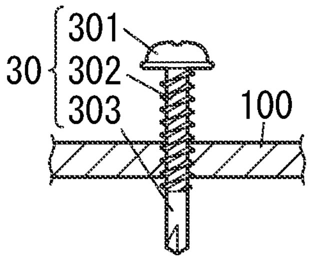
Figure 5C:
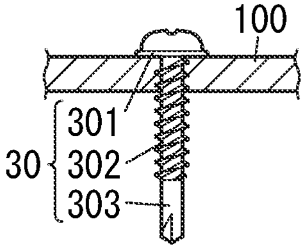

When at least a part of the tap 302 is inserted into the hole through the wall member 100 (see FIG. 5B), a load (torque) having a predetermined magnitude or more is applied to the outlet shaft 21, and therefore, the impact mechanism 17 starts performing an impact operation (at a point in time t1). The tap 302 cuts a thread groove on the inner surface of the hole through the wall member 100 while receiving impacting force via the tip tool 28 from the impact mechanism 17. Thereafter, as the fastening member 30 further advances, a part, adjacent to the head portion 301, of the tap 302 is screwed into the thread groove. Finally, the head portion 301 comes into contact with the wall member 100. In other words, the fastening member 30 is finally seated on the wall member 100 (see FIG. 5C).

At a point in time t2, the impact detection unit 49 detects the impact operation. Then, at a point in time t3 when the standby time Tw2 has passed since the point in time t2, the control unit 4 starts performing the control of stopping rotating the motor 15. Thus, the length of the standby time Tw2 is set in advance such that the fastening member 30 will be seated on the wall member at the point in time t3, for example.

Optionally, the control unit 4 may have the function of changing the length of the standby time Tw2. The impact tool 1 may include a second user interface for accepting the user's operating command, for example. The second user interface may be, for example, a button, a slide switch, or a touchscreen panel. In accordance with the user's operating command entered through the second user interface, the control unit 4 changes the length of the standby time Tw2. Alternatively, the impact tool 1 may also include a reception unit for accepting a signal that has been input, for example. The reception unit receives the signal from an external device outside of the impact tool 1. In response to the signal, the control unit 4 changes the length of the standby time Tw2. The communication between the external device and the reception unit may be either wireless communication or wired communication, whichever is appropriate.

For example, the standby time Tw2 may be selected from a first time and a second time, which is longer than the first time. If the fastening member 30 is relatively short, then the user may set the standby time Tw2 at the first time. On the other hand, if the fastening member 30 is relatively long, then the user may set the standby time Tw2 at the second time.

In the impact tool 1 according to the exemplary embodiment described above, the control unit 4 stops rotating the motor 15 in response to the detection of the impact operation by the impact detection unit 49 as a trigger, thus reducing the chances of tightening the fastening member 30 such as a drill screw too much. In addition, this also reduces the chances of the thread being stripped by tightening the fastening member 30 too much.

In addition, using at least one of the excitation current or the torque current to determine whether or not the impact mechanism 17 is performing the impact operation enables detecting the impact operation more accurately than in a situation where neither the excitation current nor the torque current is used. Consequently, this may further reduce the chances of tightening the fastening member 30 too much.

(First Variation)

Next, an impact tool 1 according to a first variation will be described with reference to FIG. 6. In the following description, any constituent element of this first variation, having the same function as a counterpart of the embodiment described above, will be designated by the same reference numeral as that counterpart's, and description thereof will be omitted herein.

Figure 6:
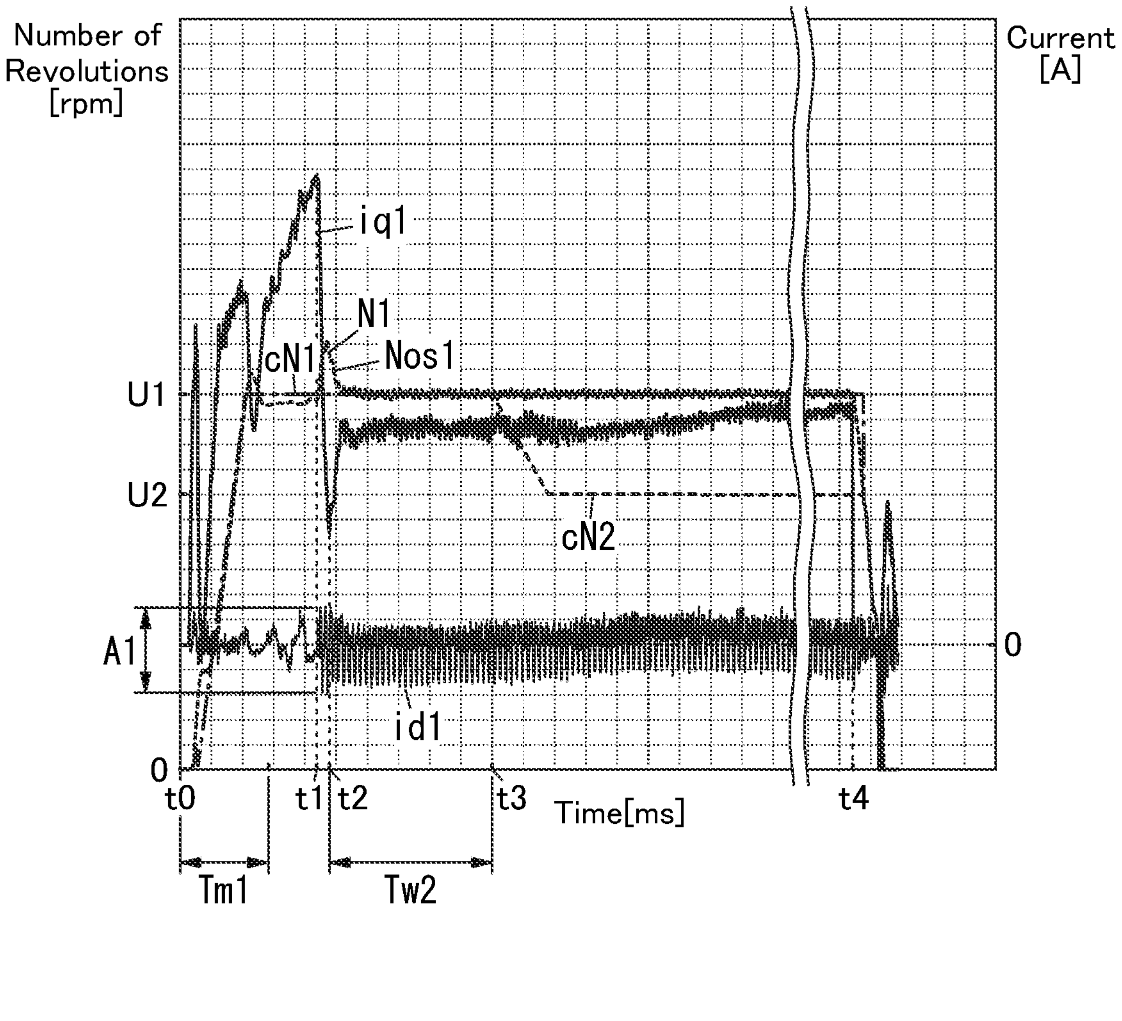
FIG. 6 is a graph showing an exemplary operation of the impact tool according to a first variation.

FIG. 6 is a graph showing the results obtained when the operation mode of the control unit 4 is the second mode. Note that the dashed line cN2 shown in FIG. 6 indicates how the command value cN1 would change from the point in time t3 if the operation mode of the control unit 4 were the first mode.

If the operation mode of the control unit 4 is the second mode and the manipulative variable of the trigger switch 29 is constant, then the command value cN1 of the number N1 of revolutions of the motor 15 does not change before and after the impact operation is detected.

The control unit 4 according to this first variation lowers, in the first mode, the number N1 of revolutions of the motor 15 in response to the detection of the impact operation by the impact detection unit 49 as a trigger.

For example, as shown in FIG. 6, the impact detection unit 49 detects the impact operation at a point in time t2. The control unit 4 lowers the number N1 of revolutions of the motor 15 at a point in time t3 when the standby time Tw2 has passed since the point in time t2. That is to say, at the point in time t3, the control unit 4 decreases the command value cN1 of the number N1 of revolutions of the motor 15 as indicated by the dashed line cN2. Accordingly, the number N1 of revolutions is also lowered. From the point in time t3 on, the control unit 4 provisionally sets the command value cN1 according to the manipulative variable of the trigger switch 29 and then decreases the command value cN1. More specifically, the command value generating unit 41 of the control unit 4 decreases the angular velocity command value cω1, thereby substantially decreasing the command value cN1 of the number N1 of revolutions.

At a point in time t4, the user stops pulling the trigger switch 29. This causes the command value cN1 to decrease to 0 rpm. Thus, the number N1 of revolutions also goes 0 rpm. That is to say, the motor 15 stops rotating.

According to this first variation, it takes a longer time for the motor 15 to stop rotating since the decision condition has been satisfied (i.e., since the standby time Tw2 has passed) compared to the exemplary embodiment described above. Thus, the standby time Tw2 is preferably set at a shorter time than in the exemplary embodiment described above.

According to this first variation, the control unit 4 determines the number N1 of revolutions that has been lowered based on the number N1 of revolutions that has not been lowered yet. For example, at the point in time t3 when the decision condition is satisfied, the control unit 4 may calculate a new command value cN1 by multiplying the command value cN1 at that point in time by a predetermined first value which is greater than zero but less than one (e.g., 0.9). Alternatively, at the point in time t3, the control unit 4 may calculate a new command value cN1 by subtracting a predetermined second value (e.g., 2000 rpm) from the command value cN1 at that point in time. Nevertheless, the control unit 4 adjusts the predetermined first or second value as appropriate such that the command value cN1 becomes equal to or greater than zero.

Lowering the number N1 of revolutions of the motor 15 extends the time it takes to have the work done by using the impact tool 1, thus allowing the user to estimate the timing to finish the work. For example, this makes it easier for the user to estimate the timing when the fastening member 30 such as a drill screw will be seated on the wall member, for example, thus allowing the user to decrease, at an appropriate timing, the manipulative variable of the trigger switch 29

(or stop pulling the trigger switch 29). This may reduce the chances of tightening the fastening member 30 too much.

In addition, lowering the number N1 of revolutions of the motor 15 may also reduce the chances of causing a "come out" phenomenon. As used herein, the "come out" phenomenon refers to an unintentional disengagement of the tip tool 28 out of the fastening member 30 while the motor 15 is running (rotating). That is to say, if the tip portion 280 of the tip tool 28 which has been inserted into the screw hole of the fastening member 30 has come out of the screw hole while the motor 15 is running (rotating), then the "come out" phenomenon has occurred.

Optionally, when finding a predetermined condition satisfied after the number N1 of revolutions of the motor 15 has been lowered at the point in time t3, the control unit 4 may stop rotating the motor 15. The predetermined condition may be, for example, that the control unit 4 detect seating of the fastening member 30. The control unit 4 may detect, when finding the variation per unit time in torque current (current measured value iq1) equal to or less than a predetermined magnitude, that the fastening member 30 has been seated on the target member of screwing. Lowering the number N1 of revolutions in advance shortens the time it takes for the motor 15 to stop rotating when seating is detected, thus reducing the chances of tightening the fastening member 30 too much.

(Second Variation)

Next, an impact tool 1 according to a second variation will be described with reference to FIG. 6. In the following description, any constituent element of this second variation, having the same function as a counterpart of the embodiment described above, will be designated by the same reference numeral as that counterpart's, and description thereof will be omitted herein.

In this second variation, the control unit 4 also lowers, in the first mode, the number N1 of revolutions of the motor 15 in response to the detection of the impact operation by the impact detection unit 49 as a trigger, as in the first variation described above. The following description of the second variation will be focused on only differences from the first variation.

The control unit 4 fulfills the impact response function by limiting the number N1 of revolutions of the motor 15 to a predetermined limit value U2 or less in response to the detection of the impact operation by the impact detection unit 49 as a trigger.

For example, when the motor 15 starts running (at a point in time t0), the command value cN1 of the number N1 of revolutions of the motor 15 is limited to an upper limit value U1 or less. More specifically, when the user pulls the trigger switch 29 to the maximum depth, the command value cN1 becomes equal to the upper limit value U1.

As used herein, "limiting the number N1 of revolutions of the motor 15 to the predetermined upper limit value U1 or less" only requires that the number N1 of revolutions be equal to or less than the upper limit value U1 at least in a steady state. Thus, the number N1 of revolutions may temporarily exceed the upper limit value U1. For example, immediately after the number N1 of revolutions increasing has reached the upper limit value U1, the number N1 of revolutions may exceed the upper limit value U1 just temporarily as shown in FIG. 6.

At the point in time t3 when the predetermined condition is satisfied after the impact detection unit 49 has detected the impact operation, the control unit 4 updates the state where the command value cN1 of the number N1 of revolutions of the motor 15 is limited to the upper limit value U1 or less into a state where the command value cN1 of the number N1 of revolutions of the motor 15 is limited to another limit value U2 or less, where the limit value U2 is smaller than the upper limit value U1. Thus, when the user pulls the trigger switch 29 to the maximum depth, the command value cN1 becomes equal to the limit value U2. That is to say, if the number N1 of revolutions of the motor 15 is greater than the limit value U2 but equal to or less than the upper limit value U1 just before the point in time t3, updating, at the point in time t3, the state where the control unit 4 limits the command value cN1 to the upper limit value U1 or less into the state where the control unit 4 limits the command value cN1 to the limit value U2 or less lowers the number N1 of revolutions of the motor 15.

According to this second variation, if the number N1 of revolutions of the motor 15 before the point in time t3 when the impact operation is detected by the impact detection unit 49 is equal to or less than the limit value U2, then the number N1 of revolutions of the motor 15 is not lowered, thus reducing the chances of the motor 15 having its number N1 of revolutions lowered to an unnecessarily low level.

Optionally, even if the number N1 of revolutions of the motor 15 before the point in time t3 when the impact operation is detected by the impact detection unit 49 is equal to or less than the limit value U2, the control unit 4 may still lower the number N1 of revolutions of the motor 15. For example, as in the first variation, the control unit 4 may determine the number N1 of revolutions that has been lowered based on the number N1 of revolutions that has not been lowered yet. Alternatively, the control unit 4 may set the number N1 of revolutions of the motor 15 at a predetermined number of revolutions which is smaller than the limit value U2. Still alternatively, the control unit 4 may limit the number N1 of revolutions of the motor 15 to a value (which is smaller than the limit value U2) or less.

Optionally, the control unit 4 may have the function of changing at least one of the upper limit value U1 or the limit value U2. The impact tool 1 may include a third user interface for accepting the user's operating command, for example. The third user interface may be, for example, a button, a slide switch, or a touchscreen panel. In accordance with the user's operating command entered through the third user interface, the control unit 4 changes at least one of the upper limit value U1 or the limit value U2. Alternatively, the impact tool 1 may also include a reception unit for accepting a signal that has been input, for example. The reception unit receives the signal from an external device outside of the impact tool 1. In response to the signal, the control unit 4 changes at least one of the upper limit value U1 or the limit value U2. The communication between the external device and the reception unit may be either wireless communication or wired communication, whichever is appropriate.

(Third Variation)

Next, an impact tool 1 according to a third variation will be described with reference to FIG. 6. In the following description, any constituent element of this third variation, having the same function as a counterpart of the embodiment described above, will be designated by the same reference numeral as that counterpart's, and description thereof will be omitted herein.

In this third variation, the control unit 4 also lowers, in the first mode, the number N1 of revolutions of the motor 15 in response to the detection of the impact operation by the impact detection unit 49 as a trigger, as in the first variation described above. The following description of the third variation will be focused on only differences from the first variation.

The control unit 4 fulfills the impact response function by setting the number N1 of revolutions of the motor 15 at a predetermined number of revolutions in response to the detection of the impact operation by the impact detection unit 49 as a trigger. The predetermined number of revolutions may be, for example, equal to the limit value U2 according to the second variation.

This third variation may reduce the chances of the motor 15 having its number N1 of revolutions lowered to an unnecessarily low level.

Optionally, if the number N1 of revolutions of the motor 15 before the point in time t3 when the impact operation is detected by the impact detection unit 49 is equal to or less than the predetermined number of revolutions, the control unit 4 may determine the number N1 of revolutions that has been lowered based on the number N1 of revolutions that has not been lowered yet, as in the first variation described above. Alternatively, the control unit 4 may set the number N1 of revolutions of the motor 15 at a predetermined second number of revolutions which is smaller than the predetermined number of revolutions (first number of revolutions).

(Fourth Variation)

Next, an impact tool 1 according to a fourth variation will be described. In the following description, any constituent element of this fourth variation, having the same function as a counterpart of the embodiment described above, will be designated by the same reference numeral as that counterpart's, and description thereof will be omitted herein.

The control unit 4 according to this fourth variation has, as mutually switchable operation modes, the following deceleration mode and stop mode. In the deceleration mode, the control unit 4 fulfills the impact response function by lowering the number N1 of revolutions of the motor 15 in response to the detection of the impact operation by the impact detection unit 49 as a trigger. In the stop mode, the control unit 4 fulfills the impact response function by stopping rotating the motor 15 in response to the detection of the impact operation by the impact detection unit 49 as a trigger.

That is to say, if the operation mode is the deceleration mode, the control unit 4 performs the same operation as the control unit 4 according to any one of the first to third variations described above. On the other hand, if the operation mode is the stop mode, then the control unit 4 performs the same operation as the control unit 4 according to the exemplary embodiment described above.

The impact tool 1 also includes a fourth user interface for accepting the user's operating command, for example. The fourth user interface may be, for example, a button, a slide switch, or a touchscreen panel. In accordance with the user's operating command entered through the fourth user interface, the control unit 4 switches the operation mode from the deceleration mode to the stop mode, and vice versa.

Switching the operation mode between the deceleration mode and the stop mode is made independently of switching the operation mode between the first mode and the second mode. Switching the operation mode between the deceleration mode and the stop mode may be made in only one of the first and second modes. Alternatively, switching the operation mode between the deceleration mode and the stop mode may also be made in both the first and second modes.

(Other Variations of the Embodiment)

Next, other variations of the embodiment described above will be enumerated one after another. Optionally, the variations to be described below may be adopted in combination as appropriate. Alternatively, any of the variations to be described below may be combined as appropriate with any of the variations described above.

The functions of the impact tool 1 may also be implemented as, for example, a method for controlling the impact tool 1, a (computer) program, or a non-transitory storage medium that stores the program thereon.

A method for controlling the impact tool 1 according to an aspect includes performing impact detection processing including determining, based on at least one of an excitation current (current measured value id1) to be supplied to the motor 15 or a torque current (current measured value iq1) to be supplied to the motor 15, whether or not the impact operation is being performed. The method for controlling the impact tool 1 includes performing restriction processing in response to detection of the impact operation through the impact detection processing as a trigger. The restriction processing includes at least one of lowering the number N1 of revolutions of the motor 15 or stopping rotating the motor 15.

Figure 7:
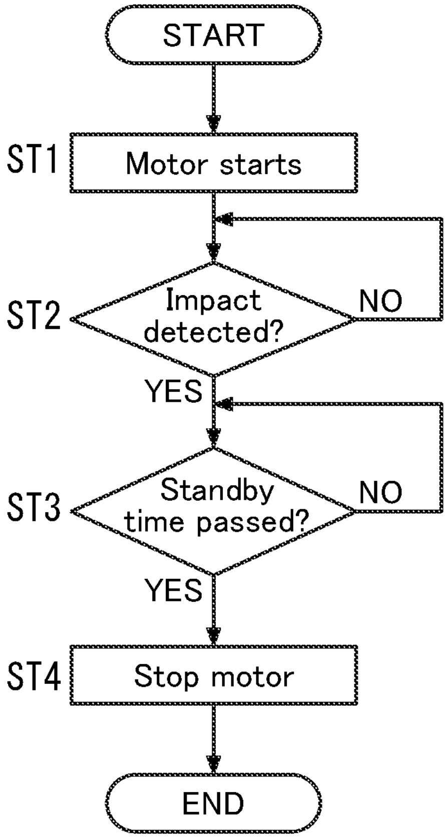
FIG. 7 is a flowchart showing a method for controlling the impact tool according to an exemplary embodiment.

Specifically, as shown in FIG. 7, first, the user pulls the trigger switch 29 to cause the motor 15 to start running (in Step ST1). Thereafter, the impact detection unit 49 determines whether or not the impact mechanism 17 is performing any impact operation (in Step ST2). When a standby time Tw2 has passed (if the answer is YES in Step ST3) since the impact mechanism 17 has started to perform the impact operation and the impact detection unit 49 has detected the impact operation (if the answer is YES in Step ST2), the control unit 4 either stops rotating the motor 15 (in Step ST4) or lowers the number N1 of revolutions of the motor 15.

A program according to another aspect is designed to cause one or more processors to perform the method for controlling the impact tool 1 described above.

The impact tool 1 according to the present disclosure includes a computer system. The computer system may include, as principal hardware components, a processor and a memory. Some of the functions of the impact tool 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the impact tool 1 are integrated together in a single housing. However, this is not an essential configuration for the impact tool 1. Alternatively, those constituent elements of the impact tool 1 may be distributed in multiple different housings. Still alternatively, at least some functions of the impact tool 1 (e.g., some functions of the impact detection unit 49) may be implemented as a cloud computing system as well.

The motor 15 may be an AC motor or a DC motor, whichever is appropriate.

The tip tool 28 does not have to be counted among the constituent elements of the impact tool 1.

The tip tool 28 does not have to be a + (plus) screwdriver bit but may also be a − (minus) screwdriver bit. Alternatively, the tip tool 28 may even be a Torx® bit or a wrench bit.

The impact detection unit 49 may be provided separately from the control unit 4. That is to say, a constituent element performing the control unit's 4 function of performing the vector control on the motor 15 and a constituent element performing the impact detection unit's 49 function of determining whether or not any impact operation is being performed may be provided separately from each other.

The motor rotation measuring unit 27 may be replaced with an acceleration sensor for measuring either the angular acceleration or circumferential acceleration of the rotary shaft 16 of the motor 15.

The impact detection unit 49 may output, when finding at least one of a first condition about the current measured value id1 or a second condition about the current measured value iq1 satisfied, a result of detection indicating that the impact mechanism 17 is performing an impact operation. Alternatively, the impact detection unit 49 may determine, based on either only the first condition or only the second condition, whether or not any impact operation is being performed.

Still alternatively, the impact detection unit 49 may also use, as the second condition, a condition about the absolute value of the current measured value iq1. For example, the impact detection unit 49 may set, as the second condition, a condition that the absolute value of the (instantaneous value of the) current measured value iq1 exceed a predetermined threshold value. Also, the impact detection unit 49 may output, when finding the first condition satisfied after the second condition has been satisfied, for example, a result of detection indicating that the impact mechanism 17 is performing an impact operation. Alternatively, the impact detection unit 49 may also output, when finding the interval between a point in time when one of the first and second conditions is satisfied and a point in time when the other condition is satisfied equal to or less than a predetermined time threshold value, for example, a result of detection indicating that the impact mechanism 17 is performing an impact operation.

Still alternatively, the impact detection unit 49 may also set, as the second condition, a condition that the absolute value of the current measured value iq1 be greater than a predetermined threshold value and then the magnitude of decrease per predetermined time in the current measured value iq1 be greater than a predetermined q-axis threshold value. Also, the impact detection unit 49 may also output, when finding the interval between a point in time when one of the first and second conditions is satisfied and a point in time when the other condition is satisfied equal to or less than a predetermined time threshold value, for example, a result of detection indicating that the impact mechanism 17 is performing an impact operation.

As can be seen, the impact detection unit 49 may determine, based on at least one of the absolute value of the current measured value iq1 (torque current) or the magnitude of decrease per predetermined time in the current measured value iq1 (torque current), whether or not the impact operation is being performed.

Still alternatively, the impact detection unit 49 may also determine, based on not only at least one of the current measured values id1, iq1 but also the number N1 of revolutions of the motor 15, whether or not the impact operation is being performed. That is to say, the impact detection unit 49 may determine, based on not only at least one of the first and second conditions but also the following third condition, whether or not the impact operation is being performed. Specifically, the third condition is that the number N1 of revolutions of the motor 15 overshoot. In other words, the third condition is that an overshoot waveform Nos1 (see FIG. 4) be observed in the waveform representing the number N1 of revolutions of the motor 15. As used herein, the "overshoot" means that a measured value is greater than a command value to a predetermined degree or more. Specifically, in FIG. 4, once the impact mechanism 17 has started performing the impact operation at the point in time t1, the load applied to the motor 15 falls while repeatedly increasing and decreasing. Thus, the number N1 of revolutions temporarily increases to exceed the command value cN1. When the difference between the number N1 of revolutions and the command value cN1 becomes equal to or greater than a predetermined magnitude, the impact detection unit 49 decides that the third condition be satisfied. When finding the first, second, and third conditions all satisfied within a predetermined period, for example, the impact detection unit 49 outputs a result of detection indicating that the impact mechanism 17 is performing the impact operation.

Optionally, the impact detection unit 49 may determine, based on the command value ciq1 instead of the current measured value iq1 of torque current, whether or not the impact operation is being performed. That is to say, in the exemplary embodiment and its variations described above, when a determination is made whether or not the impact operation is being performed, the current measured value iq1 may be replaced with the command value ciq1.

As described above, the control unit 4 fulfills the impact response function by performing restriction processing when finding a predetermined decision condition satisfied after the impact detection unit 49 has detected the impact operation. The decision condition may also be a condition that the number of times that the impact is applied by the impact mechanism 17 (hereinafter referred to as "the number of times of impact application") reach a predetermined number of times. This is an exemplary condition about the period of time that has passed since the impact detection unit 49 detected the impact operation. The number of times of impact application may be obtained based on, for example, the output of an acceleration sensor provided for the impact tool 1. The control unit 4 may start counting, right after the impact detection unit 49 has detected the impact operation, for example, the number of times of impact application by the impact mechanism 17. When the count becomes equal to or greater than a predetermined number of times, the control unit 4 may decide that the decision condition be satisfied.

Alternatively, the control unit 4 may fulfill the impact response function by performing the restriction processing right after the impact detection unit 49 has detected the impact operation without using any decision conditions.

Optionally, at least some constituent elements may be shared between two or more user interfaces out of the first through fourth user interfaces that have been described above with respect to the exemplary embodiment and its variations.

(Recapitulation)

The embodiment and its variations described above may be specific implementations of the following aspects of the present disclosure.

An impact tool (1) according to a first aspect includes a motor (15), a control unit (4), an output shaft (21), a transmission mechanism (18), and an impact detection unit (49). The control unit (4) performs vector control on the motor (15). The output shaft (21) is to be coupled to a tip tool (28). The transmission mechanism (18) transmits motive power of the motor (15) to the output shaft (21). The transmission mechanism (18) includes an impact mechanism (17). The impact mechanism (17) performs an impact operation according to magnitude of torque applied to the output shaft (21). The impact mechanism (17) applies impacting force to the output shaft (21) while performing the impact operation. The impact detection unit (49) determines, based on at least one of an excitation current (current measured value id1) to be supplied to the motor (15) or a torque current (current measured value iq1) to be supplied to the motor (15), whether or not the impact operation is being performed. The control unit (4) has an impact response function. The control unit (4) fulfills the impact response function by performing restriction processing in response to detection of the impact operation by the impact detection unit (49) as a trigger. The restriction processing includes at least one of lowering the number (N1) of revolutions of the motor (15) or stopping rotating the motor (15).

This configuration may reduce, in a situation where a fastening member (30) such as a drill screw is tightened with a tip tool (28), the chances of tightening the fastening member (30) too much by either lowering the number (N1) of revolutions of the motor (15) or stopping rotating the motor (15) after the impact mechanism (17) has started to perform the impact operation.

In an impact tool (1) according to a second aspect, which may be implemented in conjunction with the first aspect, the control unit (4) has, as mutually switchable operation modes, a first mode in which the control unit (4) enables the impact response function and a second mode in which the control unit (4) disables the impact response function.

This configuration allows the impact response function to be selectively enabled or disabled as needed.

In an impact tool (1) according to a third aspect, which may be implemented in conjunction with the second aspect, the control unit (4) switches, while the motor (15) is rotating in such a direction as to make the tip tool (28) tighten a fastening member (30), the operation mode to the first mode, and also switches, while the motor (15) is rotating in such a direction as to make the tip tool (28) loosen the fastening member (30), the operation mode to the second mode.

This configuration may reduce, in a situation where the fastening member (30) is loosened with the tip tool (28), the chances of the motor (15) having its number (N1) of revolutions lowered unintentionally or having its rotation stopped unintentionally.

In an impact tool (1) according to a fourth aspect, which may be implemented in conjunction with any one of the first to third aspects, the control unit (4) fulfills the impact response function by limiting the number (N1) of revolutions of the motor (15) to a predetermined limit value (U2) or less in response to the detection of the impact operation by the impact detection unit (49) as a trigger.

According to this configuration, if the number (N1) of revolutions of the motor (15) at a point in time before the impact operation is detected by the impact detection unit (49) is equal to or less than the limit value (U2), then the number (N1) of revolutions of the motor (15) is not lowered, thus reducing the chances of the motor (15) having its number (N1) of revolutions lowered to an unnecessarily low level.

In an impact tool (1) according to a fifth aspect, which may be implemented in conjunction with any one of the first to third aspects, the control unit (4) fulfills the impact response function by lowering the number (N1) of revolutions of the motor (15) in response to the detection of the impact operation by the impact detection unit (49) as a trigger. The control unit (4) determines the number (N1) of revolutions that has been lowered based on the number (N1) of revolutions that has not been lowered yet.

This configuration enables setting the number (N1) of revolutions that has been lowered depending on the number (N1) of revolutions that has not been lowered yet.

In an impact tool (1) according to a sixth aspect, which may be implemented in conjunction with any one of the first to third aspects, the control unit (4) fulfills the impact response function by setting the number (N1) of revolutions of the motor (15) at a predetermined number of revolutions in response to the detection of the impact operation by the impact detection unit (49) as a trigger.

This configuration may reduce the chances of the motor (15) having its number (N1) of revolutions lowered to an unnecessarily low level.

In an impact tool (1) according to a seventh aspect, which may be implemented in conjunction with any one of the first to sixth aspects, the control unit (4) has, as mutually switchable operation modes, a deceleration mode and a stop mode. In the deceleration mode, the control unit (4) fulfills the impact response function by lowering the number (N1) of revolutions of the motor (15) in response to the detection of the impact operation by the impact detection unit (49) as a trigger. In the stop mode, the control unit (4) fulfills the impact response function by stopping rotating the motor (15) in response to the detection of the impact operation by the impact detection unit (49) as a trigger.

This configuration enables switching the operation mode as needed from decelerating the motor (15) to stopping the motor (15), or vice versa, after the impact mechanism (17) has started to perform the impact operation.

In an impact tool (1) according to an eighth aspect, which may be implemented in conjunction with any one of the first to seventh aspects, the control unit (4) fulfills the impact response function by performing the restriction processing when a predetermined decision condition is satisfied after the impact detection unit (49) has detected the impact operation.

This configuration may allow the motor (15) to keep the same number (N1) of revolutions for a longer time than in a situation where the restriction processing is performed as soon as the impact detection unit (49) has detected the impact operation. This may shorten the time it takes to tighten a fastening member (30) such as a drill screw.

In an impact tool (1) according to a ninth aspect, which may be implemented in conjunction with the eighth aspect, the decision condition is a condition about a period of time that has passed since the detection of the impact operation by the impact detection unit (49).

This configuration may allow, for example, the motor (15) to keep the same number of revolutions until the work using the tip tool (28) (e.g., fastening work) is finished.

Note that the constituent elements according to the second to ninth aspects are not essential constituent elements for the impact tool (1) but may be omitted as appropriate.

A method for controlling an impact tool (1) according to a tenth aspect is a method for controlling an impact tool (1) including a motor (15), a control unit (4), an output shaft (21), and a transmission mechanism (18). The control unit (4) performs vector control on the motor (15). The output shaft (21) is to be coupled to a tip tool (28). The transmission mechanism (18) transmits motive power of the motor (15) to the output shaft (21). The transmission mechanism (18) includes an impact mechanism (17). The impact mechanism (17) performs an impact operation according to magnitude of torque applied to the output shaft (21). The impact mechanism (17) applies impacting force to the output shaft (21) while performing the impact operation. The method for controlling the impact tool (1) includes performing impact detection processing including determining, based on at least one of an excitation current (current measured value id1) to be supplied to the motor (15) or a torque current (current measured value iq1) to be supplied to the motor (15), whether or not the impact operation is being performed. The method for controlling the impact tool (1) includes performing restriction processing in response to detection of the impact operation through the impact detection processing as a trigger. The restriction processing includes at least one of lowering the number (N1) of revolutions of the motor (15) or stopping rotating the motor (15).

This method may reduce the chances of tightening a fastening member (30) too much.

A program according to an eleventh aspect is designed to cause one or more processors to perform the method for controlling the impact tool (1) according to the tenth aspect.

This program may reduce the chances of tightening a fastening member (30) too much.

Note that these are not the only aspects of the present disclosure. Rather, various configurations (including variations) of the impact tool (1) according to the exemplary embodiment described above may also be implemented as a method for controlling the impact tool (1) or a program.

REFERENCE SIGNS LIST

1 Impact Tool
4 Control Unit
15 Motor
17 Impact Mechanism
18 Transmission Mechanism
21 Output Shaft
28 Tip Tool
30 Fastening Member
49 Impact Detection Unit
id1 Current Measured Value (Excitation Current)
iq1 Current Measured Value (Torque Current)
N1 Number of Revolutions
U2 Limit Value

The invention claimed is:

1. An impact tool comprising:

a motor;

a control unit configured to perform vector control on the motor, wherein the vector control comprises breaking down a current supplied to the motor into two current components of an excitation current that generates a magnetic flux and a torque current that generates a torque, and controlling the two current components independently of each other to control the motor;

an output shaft configured to be coupled to a tip tool;

a transmission mechanism including an impact mechanism and configured to transmit motive power of the motor to the output shaft, the impact mechanism being configured to perform an impact operation of applying impacting force to the output shaft according to magnitude of torque applied to the output shaft; and an impact detection unit configured to determine, based on at least one of the excitation current or the torque current, whether or not the impact operation is being performed, the control unit having an impact response function, the control unit fulfilling the impact response function by performing restriction processing in response to detection of the impact operation by the impact detection unit as a trigger, the restriction processing including at least one of lowering a number of revolutions of the motor or stopping rotating the motor.

2. The impact tool of claim 1, wherein the control unit has, as mutually switchable operation modes, a first mode in which the control unit enables the impact response function and a second mode in which the control unit disables the impact response function.

3. The impact tool of claim 2, wherein the control unit is configured to, while the motor is rotating in such a direction as to make the tip tool tighten a fastening member, switch the operation mode to the first mode, and is configured to, while the motor is rotating in such a direction as to make the tip tool loosen the fastening member, switch the operation mode to the second mode.

4. The impact tool of claim 1, wherein the control unit is configured to fulfill the impact response function by limiting the number of revolutions of the motor to a predetermined limit value or less in response to the detection of the impact operation by the impact detection unit as a trigger.

5. The impact tool of claim 1, wherein the control unit is configured to fulfill the impact response function by lowering the number of revolutions of the motor in response to the detection of the impact operation by the impact detection unit as a trigger, and the control unit is configured to determine the number of revolutions that has been lowered based on the number of revolutions that has not been lowered yet.

6. The impact tool of claim 1, wherein the control unit is configured to fulfill the impact response function by setting the number of revolutions of the motor at a predetermined number of revolutions in response to the detection of the impact operation by the impact detection unit as a trigger.

7. The impact tool of claim 1, wherein the control unit has, as mutually switchable operation modes, a deceleration mode in which the control unit is configured to fulfill the impact response function by lowering the number of revolutions of the motor in response to the detection of the impact operation by the impact detection unit as a trigger, and a stop mode in which the control unit is configured to fulfill the impact response function by stopping rotating the motor in response to the detection of the impact operation by the impact detection unit as a trigger.

8. The impact tool of claim 1, wherein the control unit is configured to fulfill the impact response function by performing the restriction processing when a predetermined decision condition is satisfied after the impact detection unit has detected the impact operation.

9. The impact tool of claim 8, wherein the predetermined decision condition is a condition about a period of time that has passed since the detection of the impact operation by the impact detection unit.

10. The impact tool of claim 1, wherein the impact detection unit is configured to determine, based on an amplitude of the excitation current, whether or not the impact operation is being performed.

11. The impact tool of claim 1, wherein the impact detection unit is configured to determine, based on a magnitude of decrease per predetermined time in the torque current, whether or not the impact operation is being performed.

12. The impact tool of claim 1, wherein the impact detection unit is configured to determine, based on at least one of a first condition or a second condition, whether or not the impact operation is being performed, the first condition including a condition relating to the excitation current but not including a condition relating to the torque current, the second condition not including the condition relating to the excitation current but including the condition relating to the torque current.

13. A method for controlling an impact tool, the impact tool including:

a motor;

a control unit configured to perform vector control on the motor, wherein the vector control comprises breaking down a current supplied to the motor into two current components of an excitation current that generates a magnetic flux and a torque current that generates a torque, and controlling the two current components independently of each other to control the motor;

an output shaft configured to be coupled to a tip tool; and a transmission mechanism including an impact mechanism and configured to transmit motive power of the motor to the output shaft, the impact mechanism being configured to perform an impact operation of applying impacting force to the output shaft according to magnitude of torque applied to the output shaft, the method including:

performing impact detection processing including determining, based on at least one of the excitation current or the torque current, whether or not the impact operation is being performed; and performing restriction processing in response to detection of the impact operation through the impact detection processing as a trigger, the restriction processing including at least one of lowering a number of revolutions of the motor or stopping rotating the motor.

14. A non-transitory computer-readable storage medium having stored thereon a program designed to cause one or more processors of the computer to perform the method for controlling the impact tool according to claim 13.

* * * * *